United States Patent [19]

Caferro

[11] Patent Number: 4,793,324
[45] Date of Patent: Dec. 27, 1988

[54] COOKING ASSEMBLY AND METHOD FOR COOKING

[76] Inventor: Dennis Caferro, E. 508 Augusta, Spokane, Wash. 99207

[21] Appl. No.: 109,455

[22] Filed: Oct. 16, 1987

[51] Int. Cl.⁴ ............................................... F24D 1/00
[52] U.S. Cl. .................................... 126/369; 99/415; 99/449
[58] Field of Search ............... 126/369, 377, 387, 376, 126/373, 390; 99/415, 410, 413, 449, 450

[56] References Cited

U.S. PATENT DOCUMENTS

| | | |
|---|---|---|
| 533,498 | 2/1895 | Rowell . |
| 877,493 | 3/1908 | Dunfee . |
| 1,024,213 | 4/1912 | Long ................................. 126/369 |
| 1,200,741 | 3/1916 | Lindgren . |
| 1,434,262 | 11/1922 | Patterson . |
| 1,627,285 | 4/1927 | Hubbard . |
| 2,459,940 | 1/1949 | Himmel ........................ 99/449 X |
| 3,012,895 | 12/1961 | Stelnicki ....................... 99/415 X |
| 3,357,342 | 12/1967 | Dreyfus . |
| 3,389,451 | 6/1968 | Speca et al. . |
| 3,592,668 | 7/1971 | Denk .............................. 126/369 X |
| 3,908,534 | 9/1975 | Martin . |
| 3,988,975 | 12/1976 | Buter . |
| 4,527,538 | 6/1985 | Caferro . |
| 4,644,858 | 2/1987 | Liotto et al. ...................... 99/449 |

FOREIGN PATENT DOCUMENTS 83129  2/1954  Norway ............................... 99/415

Primary Examiner—Randall L. Green
Attorney, Agent, or Firm—Wells, St. John & Roberts

[57] ABSTRACT

An apparatus and method for cooking food, particularly semi-liquid foods and baking doughs. The apparatus comprises an open metallic grid containing vertical cells, the grid being located at the bottom of a covered cooking vessel and being partially immersed in liquid, such as water. The cooking method involves placement of food within a container on the upper surface of the grid and application of heat to the bottom wall. A method for both mixing baking doughs and cooking them directly on the grid while contained within a flexible plastic bag is disclosed.

14 Claims, 3 Drawing Sheets

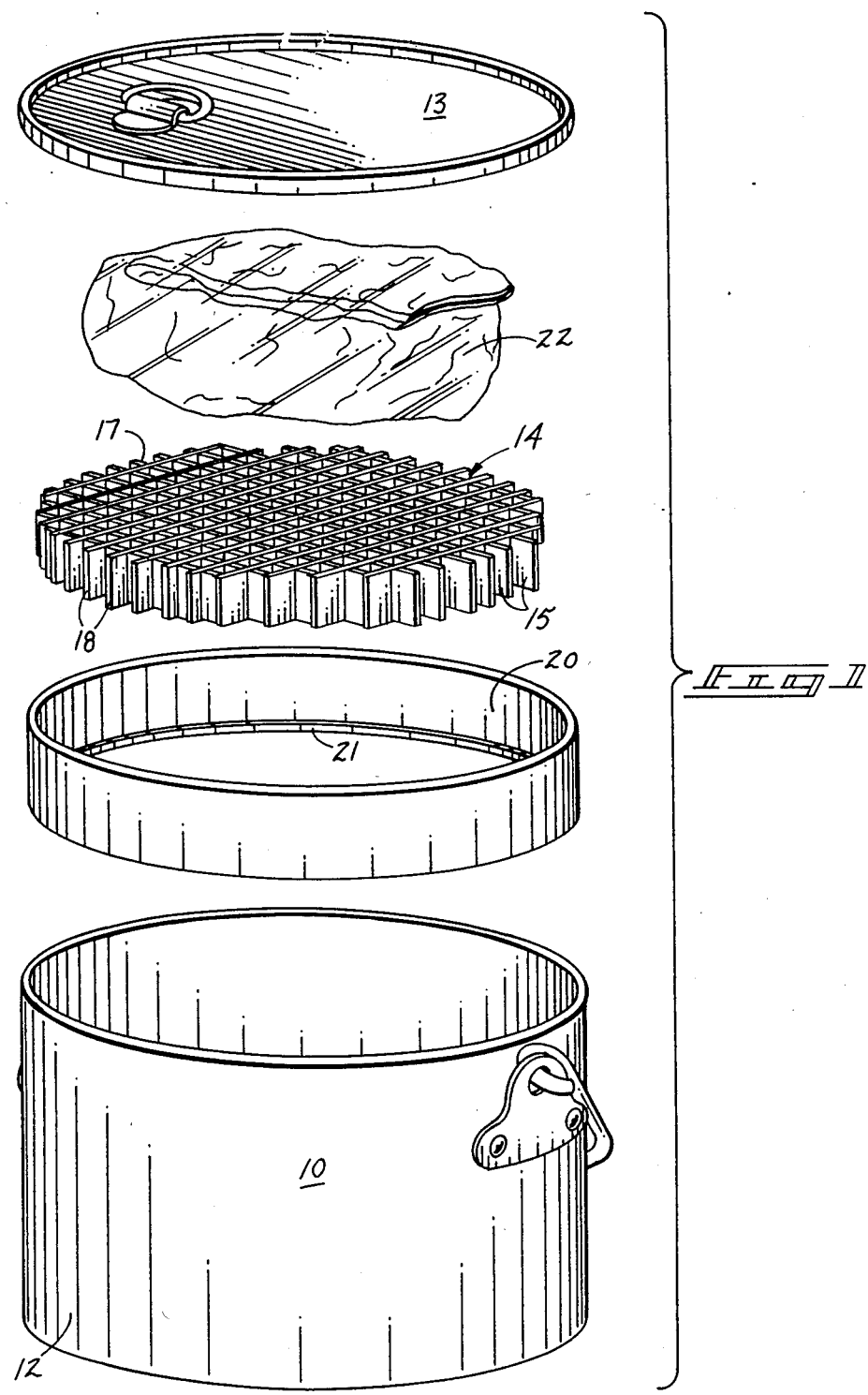

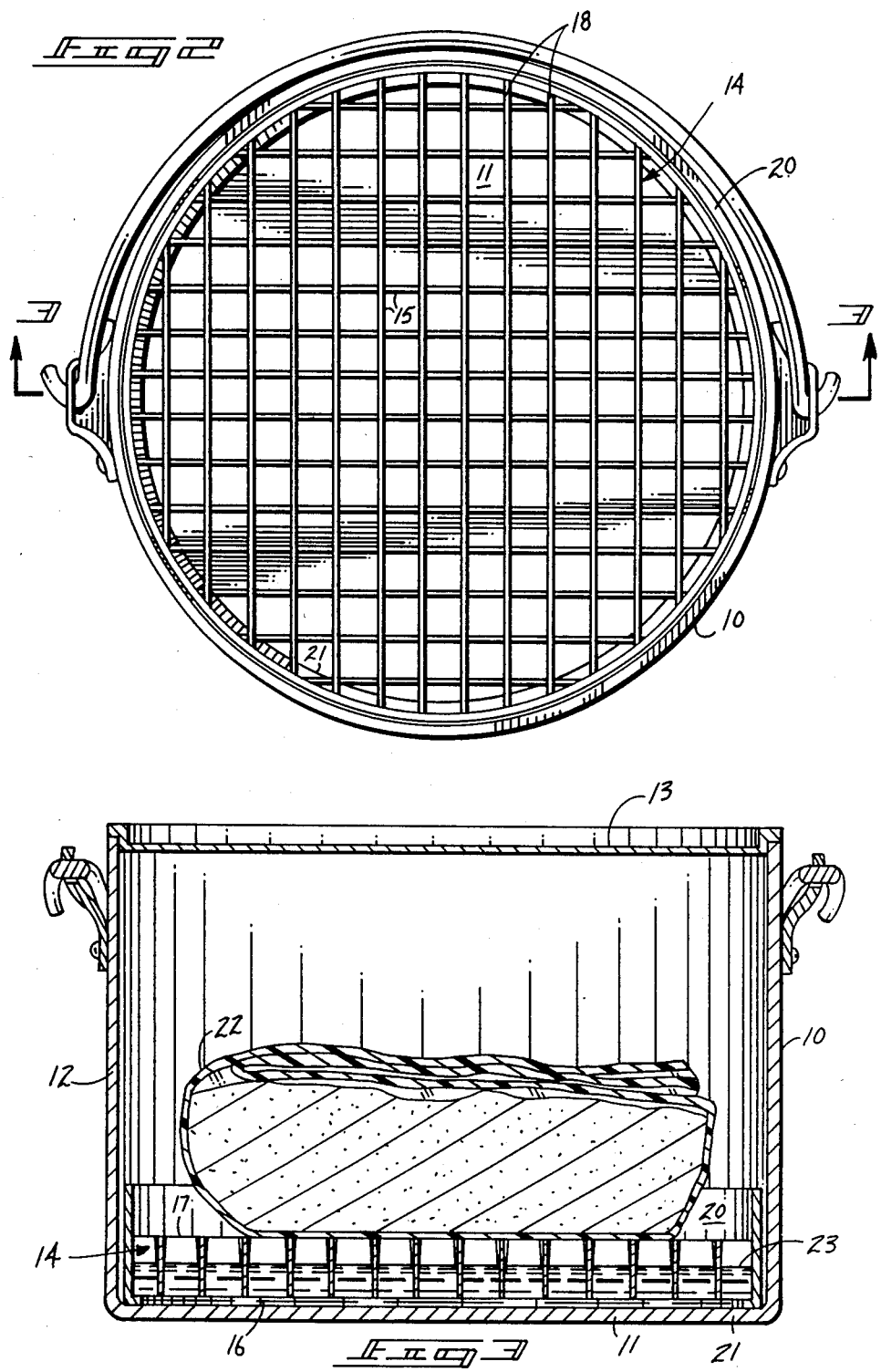

COOKING ASSEMBLY AND METHOD FOR COOKING

TECHNICAL FIELD

This disclosure relates to inserts for cooking vessels, and specifically to inserts for efficiently transferring heat from a heat source to food located within a covered cooking vessel.

BACKGROUND OF THE INVENTION

Various physical inserts have been proposed in the past in an effort to improve heat conduction and control of liquids within a cooking vessel. Their main object has normally been to prevent burning or scorching of food which normally occurs as a result of contact with the heated bottom surfaces of a cooking vessel.

U.S. Pat. No. 3,908,534 shows an imperforate heat transfer plate designed for use in a frying pan. The plate rests on integral ribs that provide substantial contact with the bottom of the pan, while providing a substantial recess under the top surface of the plate, within which fat from the food can collect.

Numerous patents have disclosed perforated plates arranged about the bottom of a cooking vessel to facilitate steaming or boiling of food while preventing direct contact between the food and the bottom surface of the cooking vessel. Examples are U.S. Pat. Nos. 1,200,741; 1,434,262; 1,627,285; and 3,988,975. They space the cooking food above the heated surface at the bottom of a cooking vessel. By providing an array of perforations about the insert, they tend to distribute the boiling steam developed in the cooking vessel, and thereby help to prevent the food and water from "boiling over" the top of the cooking vessel.

U.S. Pat. No. 877,493 to Dunfee discloses a cooking vessel including a false bottom centrally supported by partitions that divide the space between the false bottom and the bottom wall of a receiving cooking vessel into separate compartments. Steam is directed from these compartments into upright flues about the sides of the cooking vessel, as well as into a central discharge tube having a top check valve. Steam is directed radially inward from the flues and radially outward from the tube to contact food within the cooker for steaming and boiling the food. Condensed water is returned to the bottom compartments through apertures and downwardly extending tubes provided about the false bottom.

U.S. Pat. No. 3,357,342 discloses a specialized insert for increasing the velocity of steam jets directed to a block of frozen food resting on the insert. The insert is stated to be made from ceramic material and has tapered holes formed through it. The patent states that the tapered configuration of the holes creates higher steam velocity than would normally occur with the use of cylindrical holes and much higher velocity than that of steam flowing through holes in a thin body, such as sheet metal, apparently referring to false bottom inserts of the type shown in the previously-described patents.

The present invention involves the utilization of an open metallic grid to conduct heat within a cooking vessel to foods that are being cooked, particularly to those types of foods normally cooked by dry heat in an oven. This includes semi-liquid casserole dishes and baked doughs, such as breads, muffins and biscuits. While such food products can be cooked to an edible state in a frying pan or cooking pot, they will typically cook unevenly, with the bottom of the food mass being overcooked and crusty, if not scorched. One object of this effort was to provide an apparatus and method for cooking such foods which could be accomplished on a flame source or a stove top. The equipment and process described herein particularly apply to camping procedures, where cooking heat is typically available only from a small open fire or from a relatively small, concentrated heat source, such as a portable stove.

U.S. Pat. No. 4,527,538 discloses a portable oven that incorporates a heat transfer grid constructed from the same type of grid structure as disclosed herein. The grid is used to spread and conduct dry heat from a concentrated heat source. The earlier disclosure has no direct application to cooking of food in a covered vessel containing liquid.

BRIEF DESCRIPTION OF THE DRAWINGS

The preferred embodiment of the invention is illustrated in the accompanying drawings, in which:

FIG. 1 is an exploded perspective view of the cooking apparatus;

FIG. 2 is a top plan view of the cooking vessel and insert;

FIG. 3 is a vertical sectional view through the complete cooking apparatus, as seen along line 3—3 in FIG. 2;

DETAILED DESCRIPTION OF THE PREFERRED EMBODIMENT

Figure 4:
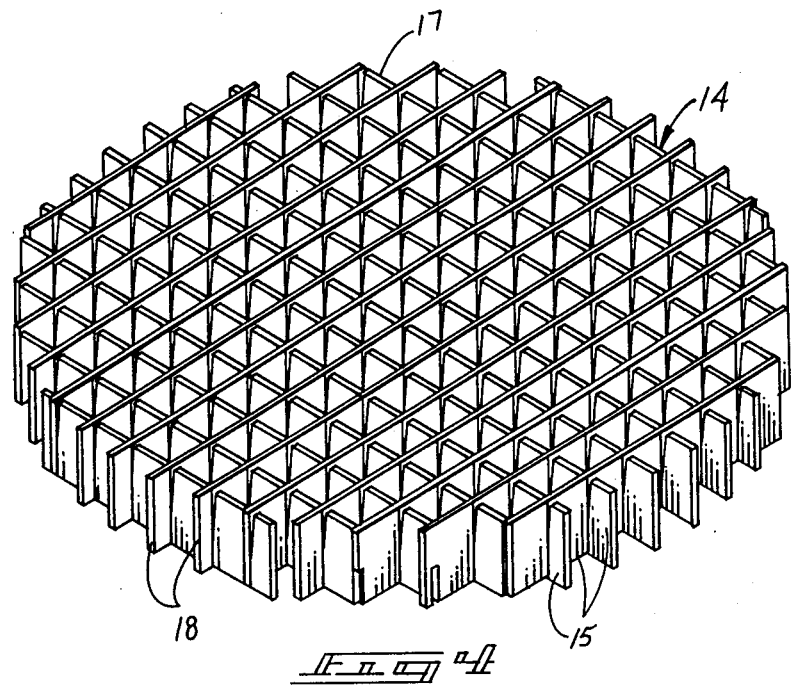
FIG. 4 is an exploded perspective view of the grid.
Figure 5:
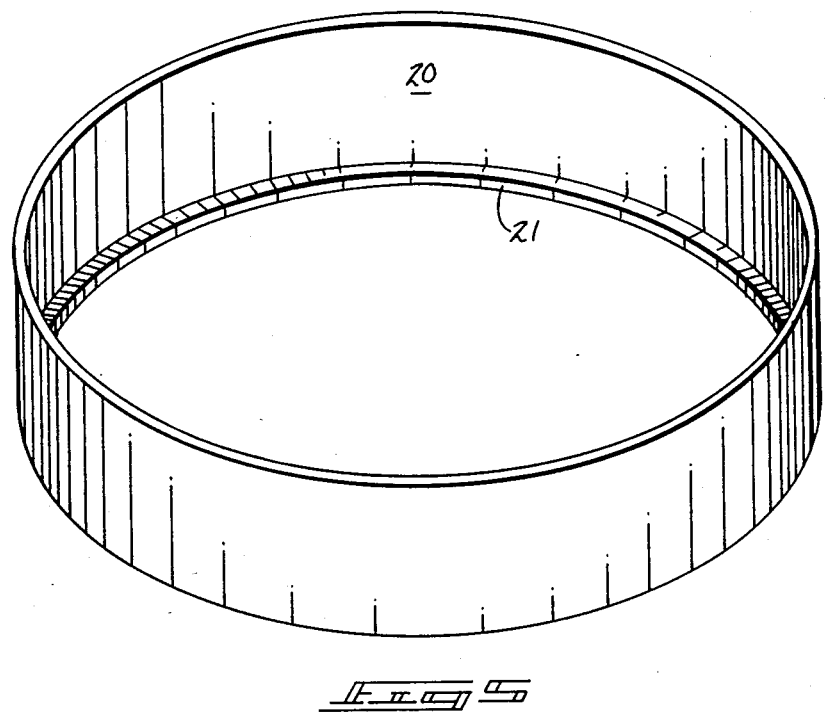
FIG. 5 is a perspective view of the peripheral wall.

The following disclosure of the invention is submitted in compliance with the constitutional purpose of the Patent Laws "to promote the progress of science and useful arts" (Article 1, Section 8).

FIGS. 1 and 3 generally illustrate the assembled components of the cooking apparatus as used in carrying out the disclosed method. These components include a covered cooking vessel 10, an interior perforate grid 14, and a quantity of boiling liquid 23 contained within the cooking vessel 10 to partially immerse the grid 14. Food within a heat-transparent container or bag 22 on the top surface of grid 14 is thereby cooked by a combination of heat transferred through the grid 14 when the bottom wall 11 of the cooking vessel is subjected to the application of heat from a stove (not shown), open flame or other source of upwardly directed heat, as well as by heat transferred to the bag contents from the steam environment within the enclosed vessel 10.

The cooking vessel 10 can be any form of conventional cooking pot or pan having a substantially planar bottom inner surface formed across its bottom wall 11, which is surrounded by side walls 12. A removable cover 13 is utilized to contain steam within the interior of cooking vessel 10. It is preferably tight-fitting, but not sealed. The illustrated cooking vessel 10 is shown as a simple cylindrical cooking pot, and the grid 14 received within it is shown as a complementary cylindrical insert. It is to be understood that the periphery of grid 14 can also be shaped to complement the configuration of non-circular side walls of a particular cooking vessel.

The perforate grid 14 is formed from a plurality of elongated upright metallic strips 15 joined to one another at spaced intersections along their respective lengths to from a honeycomb structure. The ends of the respective strips 15 terminate in an upright peripheral edge configuration about the grid which is complementary to the shape of the side walls in the cooking vessel. Each metallic strip 15 has a bottom edge 16 and a top edge 17 which respectively form bottom and top surfaces in the assembled grid 14. Grid 14 is located within the cooking vessel 10 with its bottom surface adjacent to the bottom inner surface of the cooking vessel. A quantity of boiling liquid 23 within the cooking vessel 10 is provided to a level sufficient to partially immerse the grid 14. To cook effectively, it should be filled with liquid just to the grid top surface prior to boiling.

While not always essential, grid 14 is preferably surrounded by a solid peripheral upright wall 20 located between grid 14 and the side walls 12 of the cooking vessel 10. The peripheral wall 20 protects the end edges 18 of the relatively thin metallic strips 15 and facilitates insertion and removal of grid 14 with respect to the cooking vessel 10. More importantly, it can be engaged by the flexible sides of the bag 22 to restrain further lateral expansion of the flexible bag 22 and space it inwardly from the side walls of vessel 10. This provides room for steam to escape upwardly about the grid and bag and prevents the bag 22 and its contents from acting as a plug or seal above the boiling liquid.

Greater detail with respect to the structure of the cooking vessel insert can be seen from FIG. 4, which is an exploded view looking upwardly at the grid components. Grid 14 is formed from a plurality of elongated upright solid metallic thin walls shown as strips 15 that are joined to one another at spaced intersections along their respective lengths. The strips 15 are arranged in planes perpendicular to the bottom and top surfaces of the grid to form a plurality of vertically open cells or passageways surrounded by the intersecting strips across the grid 14. The intersections on the respective lengths of the strips 15 forming the grid 14 are preferably equally and identically spaced about the grid 14 to produce a repetitive pattern of identical cells of constant cross-section, each cell being unobstructed and open at both the bottom and top surfaces of grid 14.

Grid 14 is preferably made from first and second intersecting groups of strips. The strips within the two groups are identical, but inverted relative to one another. The strips of a first group are slotted along their bottom edges 16, while the strips of the second groups are slotted along their top edges 17. The inversion of the two groups of strips 15 permits the oppositely slotted strips to intersect and join to one another. By slotting the strips 15 to a depth just slightly less than one half their height, the intersecting strips can be forced toward one another until their respective bottom edges 16 and their top edges 17 are coplanar. The resulting upset produced at the base of each slot forms a cold-welded joint securing the strips to one another of their intersections. Other grid structures suitable for this application are disclosed in U.S. Pat. Nos. 533,498 to Rowell, patented Feb. 5, 1895 and 3,389,451 to Speca et al. patented June 25, 1968, which are hereby incorporated into this disclosure by reference. The grid can be produced by an equivalent fabrication method. The grid edges can be cut following grid fabrication, or can be pre-cut prior to joining the strips to one another.

The strips 15 within the respective groups of strips are preferably arranged perpendicular to one another. While not essential, it is preferred that the individual strips within both groups have a common height along their respective lengths. They are arranged with their bottom and top edges in parallel common planes. This presents elevationally spaced bottom and top surfaces across the grid. The illustrated grid has walls whose height between their bottom and top edges is greater than the spacing between the walls within the grid. As a specific example of such a grid, the strips might have a height of one inch, with the intersections along each strip being spaced at one-half inch centers, thereby producing open cells extending through grid 14 having a height of one inch and a one-half inch square cross-section. A typical grid might be formed from strips of aluminum having a thickness of 0.025 inches, the aluminum having smooth rolled surfaces, but being otherwise uncoated.

The peripheral wall 20 can be produced from a metallic strip having a thickness identical to that of the strips 15, or it can be slightly thicker for reinforcement purposes. It need not necessarily be physically joined to strips 15, since light frictional engagement between the end edges 18 of the strips 15 and the inner surface of the wall 20 will suffice to keep the peripheral wall 20 in place about the grid 14. To further assist in locating the grid 14 with respect to peripheral wall 20, its bottom edge 21 can be bent or rolled inwardly to slightly overlap the bottom edges 16 of the strips 15 adjacent the respective ends of the strips. This overlap results in slight spacing between the bottom surface of grid 14 and the interior surface of bottom wall 11 in the cooking vessel 10, which helps to accommodate imperfections or crowning across the bottom wall 11.

The food to be cooked is enclosed within a heat-transparent container or bag 22 that envelope the food and rests freely on the top surface of grid 14. Common clear polyethylene plastic bags used for food storage and cooking purposes are readily adaptable to this application. Foil and heat-reflective surfaces should not be used in bag 22. The bag should not be tightly sealed, since expanding steam and gases with the bag 22 must be released in order to prevent its destruction during cooking. It has been found best to lightly fold the bag opening over the top of the food when bag 22 is resting on grid 14. This permits steam and gases to escape, while still covering and enclosing the food.

The use of a flexible bag 22 is of particular utility when cooking baked dough, since it permits the dough ingredients to be mixed within the cooking bag 22 prior to placement within cooking vessel 10. The exterior of the bag 22 can be manually kneaded to effect mixing of the bag contents without requiring use of a separate container and conventional mixing utensils.

The present method of cooking food involves the step of resting the container or bag 22 containing food upon the upper surface of the open grid 14 while the grid 14 is only partially immersed in liquid at the bottom of a covered cooking vessel 10. The method is accomplished by applying heat to the bottom wall 11 of the cooking vessel 10 until the food is completely cooked within bag 22.

In the preferred form of the method, raw food is placed within a flexible bag which contains the food as it rests upon the upper surface of the open grid. When the food requires mixing prior to application of heat such as a baking dough, the method can also comprise the step of mixing liquid and solid ingredients of the food within the flexible bag by manually kneading its exterior prior to resting it on the upper surface of the grid 14.

Various types of foods have been effectively and efficiently cooked by the apparatus and method described above. These include casserole dishes and baking doughs normally requiring dry heat cooking processes, which cannot be effectively cooked in an even manner by application of heat on a stove top or over an open flame source of heat. The method has been used for effectively cooking baking doughs that normally require oven temperatures more than 100° F. greater than the boiling temperature of water at sea level. As an example, a premixed muffin mix was effectively and evenly cooked as described above by preboiling and continuing to boil water within the grid 14 for a period of 25 minutes (at sea level) while maintaining the cooking vessel in a tightly covered condition. The cooking vessel remained covered for an additional period of 10 minutes before removing the cover and contents, which were then fully cooked. The resulting product was evenly cooked and indistinguishable from similarly prepared dough baked conventionally in a much hotter dry oven.

The mechanisms by which heat is transferred to the food being cooked within the bag 23 resting on grid 14 are not fully understood, but appear to involve heat transfer within vessel 22 by the mutual mechanisms of conduction, convection, and radiation. The significance of grid 14 as an interior heat conductor can be appreciated, in that the grid previously described, having cells ½ inch by ½ inch by 1 inch high, presents a total surface area about 8 times greater than the area of the cooking vessel it covers. This substantially increases conduction of heat from cooking vessel 22 to the water within which grid 14 is partially immersed. Heat is also transferred throughout the gasious environment within the cooking vessel 10 by convection. Within the cells of grid 14, heat is also transferred to the air and gas (steam) by radiation.

More importantly, grid 14 appears to act as a highly efficient heat exchanger to transfer heat from the bottom of cooking vessel 10 to the interior liquid and food being cooked. Part of that heat escapes from within rid 14 to the environment surrounding the bag 22. Heat is effectively transferred to the bag 22 and its contents as a result of the turbulent flow and mixing of heated air and gas contained within the covered cooking vessel 10. The efficiency of the cells within grid 14 in transferring heat to the free liquid might be compared to the heat transfer properties of boilers and heat exchangers that utilize a bundle of tubes to present large surface areas for heat exchange purposes.

The area of grid 14 directly under the bag 22 appears to act as a series of heat pipes. A heat pipe typically consists of a hollow tube closed at both ends and partially filled with a liquid that boils at a desired temperature. One end of the tube is immersed in a warm region. The other is immersed in a cold region. Then heat is transferred through the heat pipe from the warmer to the colder region. As liquid fills the lower end of the tube and starts boiling, the resulting vapor or gas is forced upwardly, where it condenses at the colder region. Gravity causes condensed liquid to run down along the inner surface of the tube, maintaining a steady circulation of fluid within the pipe. Heat is required to evaporate the liquid, which removed heat of evaporation in the hot region. The same amount of heat is released when the fluid is condensed and is transferred to the cold region. The circulation of fluid within the heat pipe causes the transfer of heat from the warm to the cold region.

In the present arrangement, the downwardly facing surface of bag 22 constitutes a cold region at the top of each cell, which is partially filled with water. By providing a plurality of small "heat pipes" arranged about the bottom of cooking vessel 10, the boiling action of the water is compartmentalized into vertical columns in which adjacent passageways through the insert body are formed and separated by thin walls, and the violet boiling action that would occur within a conventional cooking vessel of the same size is minimized. The present invention appears to utilize the ability of heat pipes to transport large quantities of heat with small temperature differences. Once the water is boiling, it also seems to utilize the known ability of a heat pipe to operate at a nearly constant temperature regardless of the amount of heat being transferred per unit of time. It has been found that the flame or heat source used at the exterior of cooking vessel 10 can be substantially reduced once boiling of the water occurs, and the cooking time for the food will be constant, regardless of the amount of heat applied to the bottom of cooking vessel 10.

In the case of cooked doughs, such as bread, it has been observed that the dough is first fully cooked across it's bottom surface within bag 22 while resting on grid 14. The last section of the dough to "set" and fully cook is the central top area. This appears to be consistent with the theory of heat transfer through the grid cells to which the bottom of bag 22 is directly exposed. While the exchange of heat to the environment within cooking vessel 10 is increased in efficiency because of the heat conduction properties of grid 14, the amount of heat transferred to the material resting at the bottom of bag 22 due to the heat pipe phenomenon is much greater and will result in faster cooking of this area. However, since the temperature of each cell never exceeds the boiling temperature of the liquid (212° F. for water at sea level), no overcooking, burning or scorching of the food within bag 22 has been seen to occur.

While the disclosed apparatus and method is particularly useful in cooking foods that normally require dry air cooking within an oven, they are equally applicable to cooking other foods, such as meat, fish, and vegetables, with or without the addition of water to the interior of bag 22 containing them. The transfer of heat to these food materials apparently occurs by the same mechanism that effectively produces "baked goods" within a stove top cooking vessel.

In compliance with the statute, the invention has been described in language more or less specific as to structural features. It is to be understood, however, that the invention is not limited to the specific features shown, since the means and construction herein disclosed comprise a preferred form of putting the invention into effect. The invention is therefore, claimed in any of its forms on modifications within the proper scope of the appended claims, appropriately interpreted in accordance with the doctrine of equivalents.

I claim:

1. A cooking vessel insert adapted for placement in the bottom of an upright covered cooking vessel that contains a layer of water of a prescribed depth for enabling food in a flexible container within the cooking vessel to be rapidly cooked or baked at a temperature substantially equal to the boiling point of the layer of water as the water is boiled in response to application of heat to the bottom of the cooking vessel, comprising:

an insert body complementary in shape to the bottom of the cooking vessel;

the insert body having a honeycomb structure presenting a large number of open ended, vertical passageways extending from a bottom surface to a top surface of the insert body for subdividing water within a cooking vessel into vertical columns in which adjacent passageways are formed and separated by thin walls;

the thickness of the insert body between its top and bottom surfaces being greater than the depth of the layer of water within the cooking vessel to enable a flexible container of food to be supported on its top surface above the layer of water with the flexible container overlying and enclosing a substantial number of the passageways having columns of water therein to form a plurality of evaporative heat pipes within the insert body for transfer of large quantities of heat from the bottom of the cooking vessel through the enclosed columns of water within the enclosed passageways to and through the overlying flexible container to rapidly cook or bake food within the flexible container at substantially the boiling temperature of the water.

2. The cooking vessel insert of claim 1, wherein the thin walls of the honeycomb structure have a combined heat conductive surface area that is many times greater than the bottom surface area of a complementary cooking vessel.

3. The cooking vessel insert of claim 1 wherein the passageways have a substantially uniform cross-sectional configuration between the top and bottom surfaces of the insert body.

4. The cooking vessel insert of claim 1 wherein the passageways have a length dimensions between the top and bottom surfaces of the insert body that is greater than their maximum width.

5. The cooking vessel insert of claim 1 wherein the cross-sectional configurations of the passageways are identical about the insert body.

6. The cooking vessel insert of claim 1 wherein the honeycomb structure includes a plurality of intersecting solid strips that form the thin walls separating the passageways.

7. The cooking vessel insert of claim 6 wherein the solid strips intersect one another at uniformly spaced intervals to form passageways between them of identical cross-sectional shape.

8. The cooking vessel insert of claim 1 further comprising: a solid peripheral wall surrounding the insert body.

9. The cooking vessel insert of claim 8 wherein the solid peripheral wall includes one edge adjacent to the bottom surface of the insert body;

the one edge of the wall being bent inwardly to slightly overlap the bottom surface of the insert body about its periphery.

10. A cooking assembly, comprising:

a covered cooking vessel containing a layer of water of a prescribed depth and having a substantially planar bottom inner surface surrounded by side walls;

an insert body complementary in shape to the bottom of the cooking vessel;

the insert body having a honeycomb structure defining a plurality of open ended, vertical passageways extending from a bottom surface of the insert body directly adjacent to the inner surface of the covered cooking vessel to a top surface of the insert body for subdividing the layer of water into a plurality of vertical columns within passageways formed through the insert body;

adjacent passageways within the insert body being formed and separated by thin walls;

the height of the insert body between its top and bottom surfaces being greater than the depth of the layer of water to enable a flexible container of food to be supported on the top surface of the insert body above the layer of water with the flexible overlying and enclosing a plurality of closely adjacent passageways having columns of water therein to form a plurality of evaporative heat pipes for transfer of large quantities of heat from the bottom of the cooking vessel through the enclosed columns of water and to and through the overlying flexible container to rapidly cook or bake food within the flexible container at substantially the boiling temperature of the water.

11. The cooking assembly of claim 10 further comprising:

a peripheral upright wall surrounding the insert body and interposed between the insert body and the side walls of the cooking vessel.

12. A method of cooking food within an upright covered cooking vessel containing a layer of water of a prescribed depth, comprising the following steps:

placing food within a flexible container;

supporting the flexible container and food upon the upper surface of an insert body complementary in shape to the bottom of the cooking vessel and having a honeycomb structure defining open ended passageways extending from the bottom surface of the insert body to its top surface for subdividing the layer of water into vertical columns within passageways formed and separated by thin walls, the height of the insert body being greater than the depth of the layer of water; and applying heat to the bottom of the cooking vessel to boil the water and transfer large quantities of heat from the bottom of the cooking vessel through a plurality of evaporative heat pipes formed by the columns of water within the passageways to rapidly cook or bake food within the flexible container at substantially the boiling temperature of the layer of water.

13. The method of claim 12 wherein the food requires mixing prior to application of heat, and comprising the following additional step:

mixing liquid and solid ingredients of the food within the flexible container prior to placing the container and food upon the upper surface of the insert body.

14. The method of claim 13 wherein the flexible container is an open bag and the mixing step is accomplished by manually kneading the bag exterior.

* * * * *